US008553017B2

(12) United States Patent
Jung et al.

(10) Patent No.: US 8,553,017 B2
(45) Date of Patent: Oct. 8, 2013

(54) GATE-DRIVING APPARATUS AND DISPLAY DEVICE INCLUDING THE SAME

(75) Inventors: Hyung-Gi Jung, Cheonan-si (KR); Jeong-Young Lee, Asan-si (KR); June-Woo Lee, Cheonan-si (KR); Sok Lee, Cheonan-si (KR)

(73) Assignee: Samsung Display Co., Ltd. (KR)

(*) Notice: Subject to any disclaimer, the term of this patent is extended or adjusted under 35 U.S.C. 154(b) by 721 days.

(21) Appl. No.: 12/709,846

(22) Filed: Feb. 22, 2010

(65) Prior Publication Data

US 2010/0225621 A1 Sep. 9, 2010

(30) Foreign Application Priority Data

Mar. 5, 2009 (KR) ........................ 10-2009-0018970

(51) Int. Cl.
*G06F 3/038* (2013.01)
*G09G 5/00* (2006.01)

(52) U.S. Cl.
USPC .......................................................... 345/204

(58) Field of Classification Search
USPC .......................................................... 345/204
See application file for complete search history.

(56) References Cited

U.S. PATENT DOCUMENTS

2003/0234770 A1* 12/2003 MacKey ........................ 345/173
2005/0104814 A1* 5/2005 Choi et al. ........................ 345/76
2007/0182686 A1* 8/2007 Chen et al. ........................ 345/98
2007/0192659 A1* 8/2007 Kang et al. .................... 714/726
2008/0212245 A1* 9/2008 Choi ............................... 361/56

FOREIGN PATENT DOCUMENTS

JP 2001-021912 1/2001
KR 10-2006-0021530 3/2006
KR 10-2008-0053977 6/2008

* cited by examiner

*Primary Examiner* — Alexander S Beck
*Assistant Examiner* — Joseph Pena
(74) *Attorney, Agent, or Firm* — Cantor Colburn LLP

(57) ABSTRACT

A gate driving apparatus includes a first stage which outputs a first gate output signal, and a second stage which outputs a second gate output signal. The first stage includes: a transistor which includes a gate electrode, a source electrode and a drain electrode; and a dummy transistor which includes a dummy gate electrode, a dummy source electrode and a dummy drain electrode. The gate electrode receives the second gate output signal, and the dummy source electrode is connected to the source electrode or the drain electrode of the transistor and prevents static electricity from flowing to the first stage.

13 Claims, 13 Drawing Sheets

GATE-DRIVING APPARATUS AND DISPLAY DEVICE INCLUDING THE SAME

This application claims priority to Korean Patent Application No. 10-2009-0018970, filed on Mar. 5, 2009, and all the benefits accruing therefrom under 35 U.S.C. §119, the content of which in its entirety is herein incorporated by reference.

BACKGROUND OF THE INVENTION

1. Field of the Invention

The present invention relates to a gate driving apparatus and a display device including the same, and more particularly, to a gate driving apparatus including an antistatic unit and a display device including the same.

2. Description of the Related Art

Liquid crystal displays ("LCDs") are a widely used type of flat panel displays. Generally, an LCD includes a pair of substrates, substrates thereof having electrodes disposed thereon, and a liquid crystal layer interposed between the substrates. In an LCD, voltages are applied to the electrodes to generate an electric field the substrates. Accordingly, an alignment of liquid crystal molecules in the liquid crystal layer is controlled, and a polarization of incident light is thereby controlled. As a result, a desired image is displayed on the LCD.

In a conventional LCD, gate driving integrated circuits ("ICs") are typically mounted using a tape carrier package ("TCP") method or a chip on the glass ("COG") method. However, other methods are needed to improve the LCD, such as by lowering manufacturing costs and/or product size, and by simplifying or otherwise improving design of the LCD, for example.

Accordingly, a gate driver, which generates a gate output signal using an amorphous silicon thin-film transistor ("TFT") directly mounted on a glass substrate, has been developed. However, substantially amounts of electric charges accumulate in or near a source or drain line, a gate line, or a gate insulating film, for example, when a plurality of the amorphous silicon TFTs are disposed in such a gate driver. The electric charges that accumulate generate static electricity in a gate driving apparatus having the gate driver, and when a display device having the gate driver operates, performance of the display device is substantially degraded. Thus, there is substantial need to develop a gate driving apparatus and, more particularly, a gate driving apparatus using a plurality of amorphous silicon TFTs mounted on a glass substrate, that is highly resistant to static electricity.

BRIEF SUMMARY OF THE INVENTION

Exemplary embodiments of the present invention provide a gate driving apparatus having substantially improved resistance to static electricity.

Additional exemplary embodiments of the present invention also provide a display device including the gate driving apparatus.

In an exemplary embodiment, a gate driving apparatus includes a first stage which outputs a first gate output signal, and a second stage which outputs a second gate output signal. The first stage includes: a transistor which includes a gate electrode, a source electrode and a drain electrode; and a dummy transistor which includes a dummy gate electrode, a dummy source electrode and a dummy drain electrode. The gate electrode receives the second gate output signal, and the dummy source electrode is connected to the source electrode or the drain electrode of the transistor and prevents static electricity from flowing to the first stage.

In another exemplary embodiment, a display device includes a substrate which includes a display region and a non-display region surrounding the display region, and a gate driver which includes a gate driving apparatus disposed in the non-display region. The gate driving apparatus includes a first stage which outputs a first gate output signal, and a second stage which outputs a second gate output signal. The first stage includes a signal reception unit which receives the second gate output signal, and an antistatic unit which is connected to the signal reception unit and prevents static electricity from flowing to the first stage.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
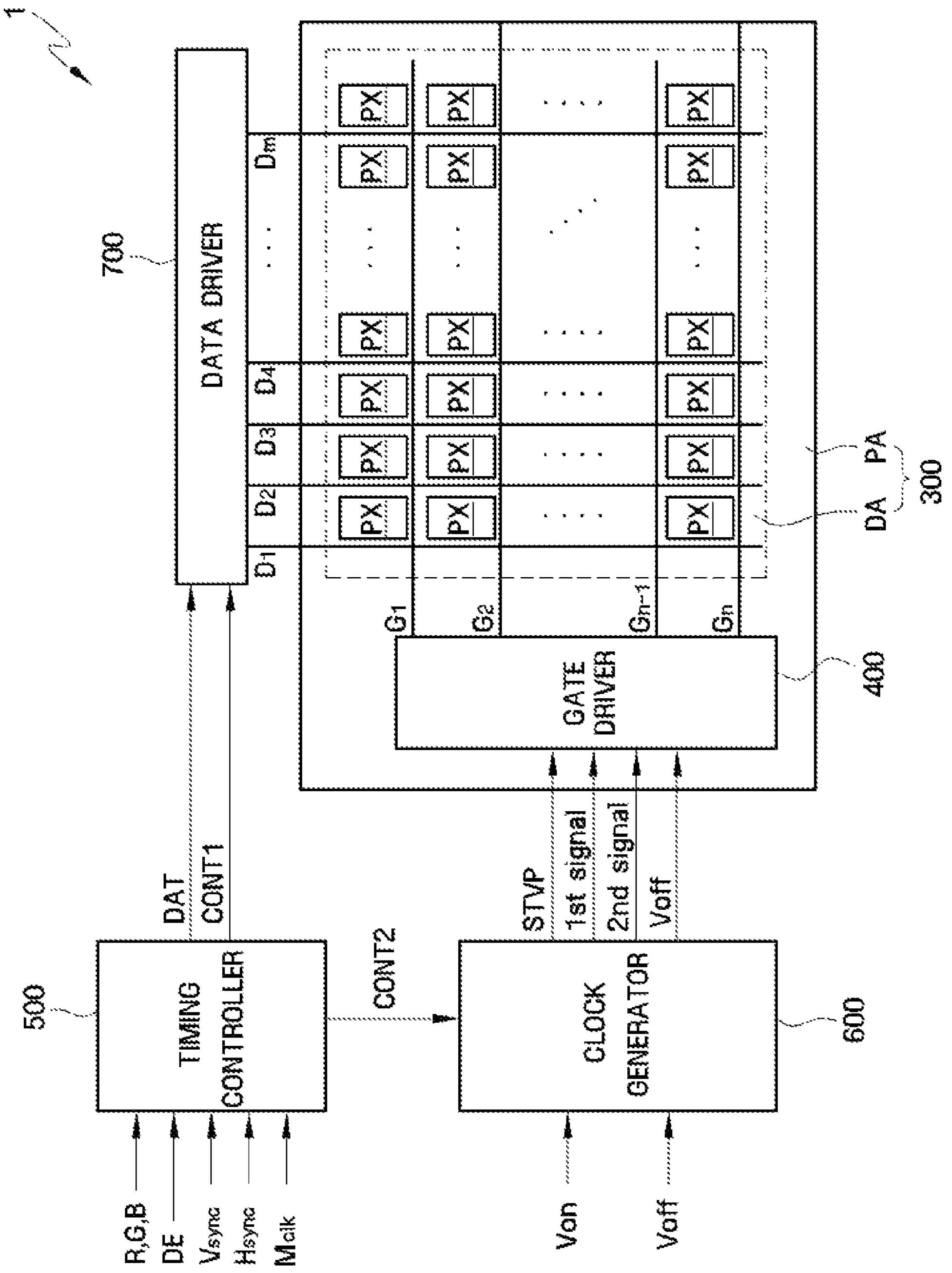
FIG. 1 is a block diagram of an exemplary embodiment of a gate driving apparatus and an exemplary embodiment of a display device having the same according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a gate driving apparatus and a display device having the same will be described in further detail with reference to the accompanying drawings.

An exemplary embodiment of a gate driving apparatus and a display device including the same according to an exemplary embodiment will now be described in further detail with reference to FIGS. 1 through 5.

Figure 2:
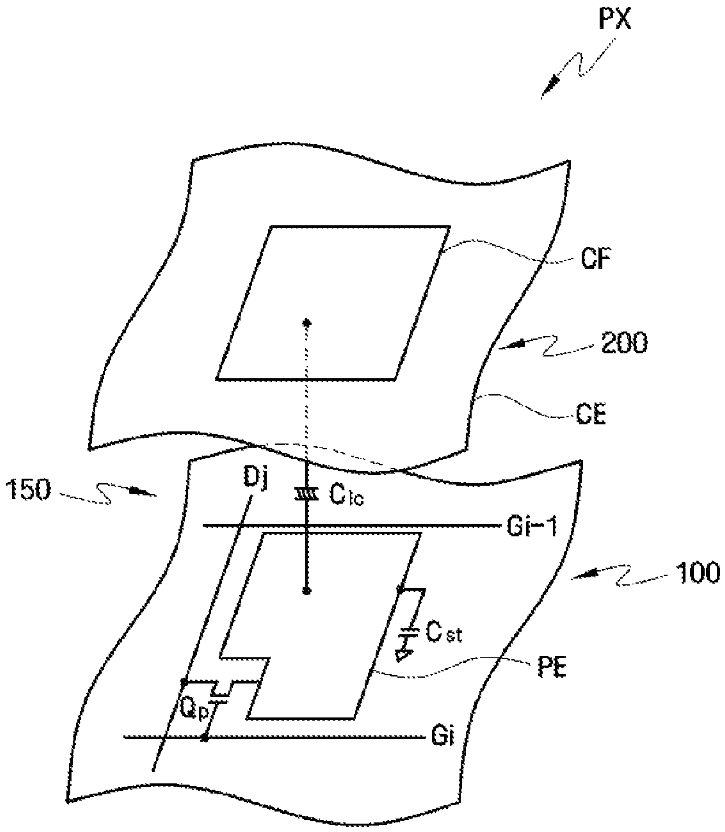
FIG. 2 is an equivalent schematic circuit diagram of a pixel of the display device shown in FIG. 1.
Figure 3:
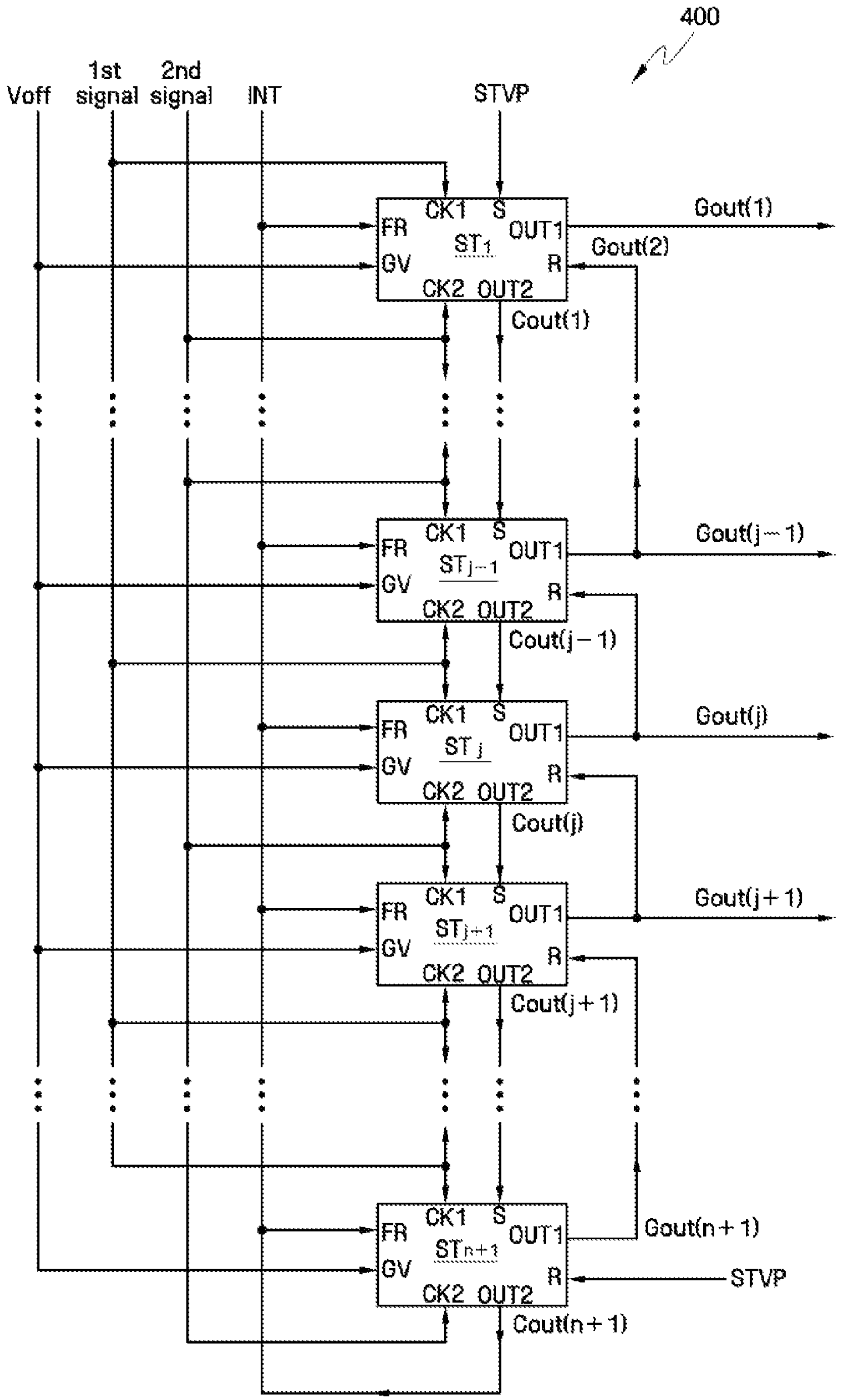
FIG. 3 is a block diagram the gate driving apparatus included in an exemplary embodiment of a gate driver of the display device shown in FIG. 1.
Figure 4:
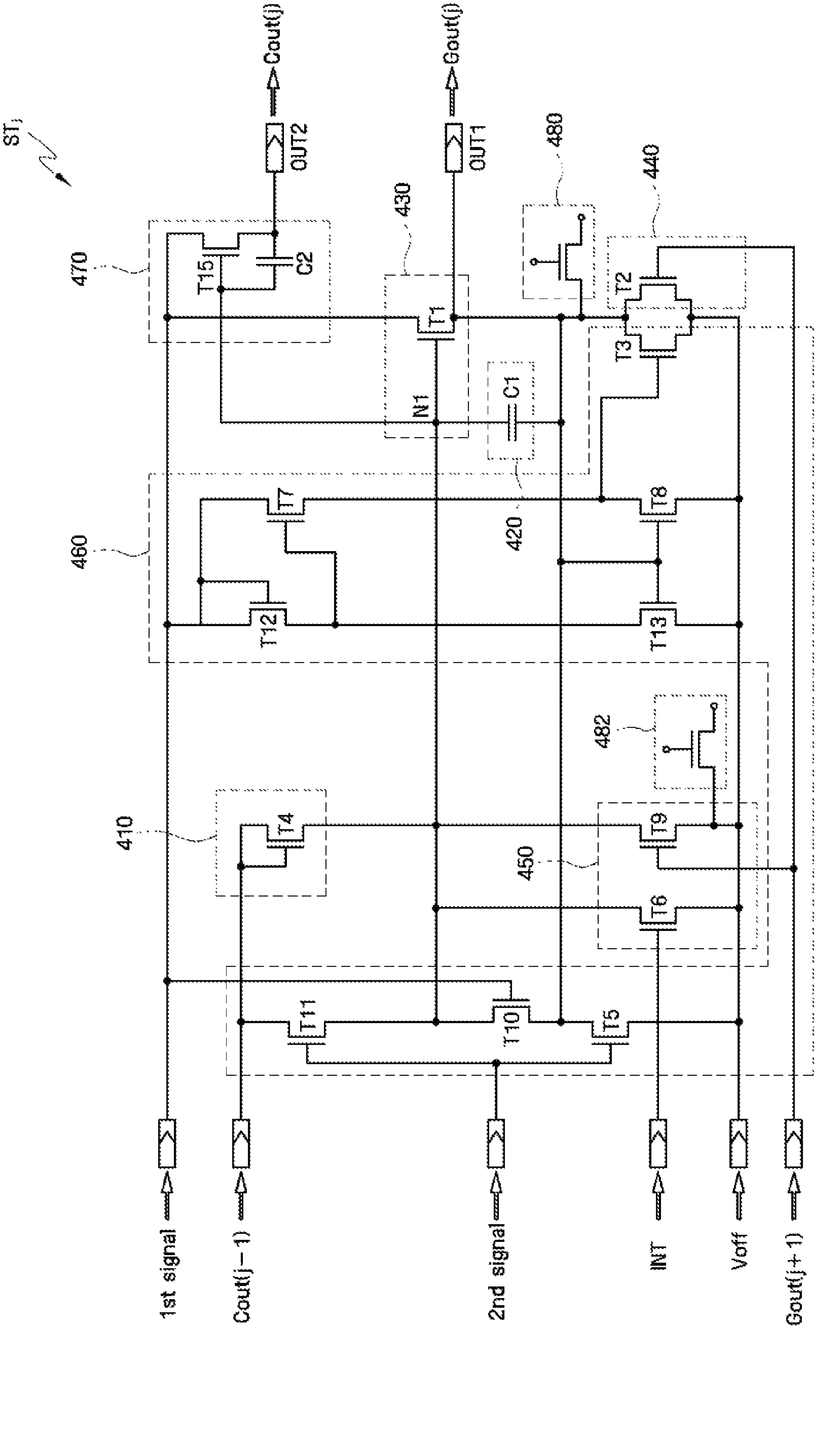
FIG. 4 is a schematic circuit diagram of a $j^{th}$ stage of the gate driving apparatus shown in FIG. 3.
Figure 5:
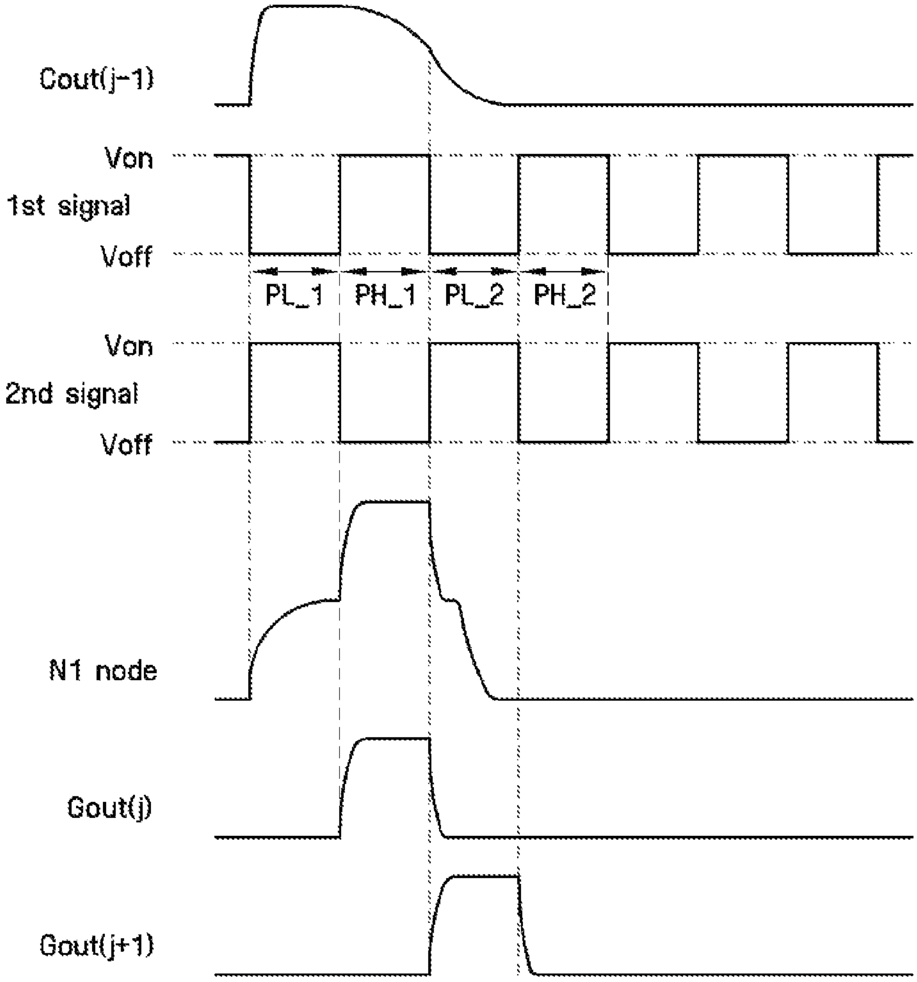
FIG. 5 is a signal timing diagram illustrating an operation of the $j^{th}$ stage shown in FIG. 4.

FIG. 1 is a block diagram of an exemplary embodiment of a gate driving apparatus and a display device having the same. FIG. 2 is an equivalent schematic circuit diagram of a pixel of the display device shown in FIG. 1. FIG. 3 is a block diagram of an exemplary embodiment of a gate driving apparatus included in a gate driver of the display device shown in FIG. 1. FIG. 4 is a schematic circuit diagram of an exemplary embodiment of a $j^{th}$ stage $ST_j$ of the gate driving apparatus shown in FIG. 3. FIG. 5 is a signal timing diagram illustrating an exemplary embodiment of an operation of the $j^{th}$ stage $ST_j$ shown in FIG. 4.

Referring to FIG. 1, a display device 1 according to an exemplary embodiment includes a liquid crystal panel 300, a timing controller 500, a clock generator 600, a gate driver 400 and a data driver 700.

The liquid crystal panel 300 divided into a display region DA in an image is displayed and a non-display region PA, e.g., a peripheral region PA, in which the image is not displayed.

To display the image, the display region DA includes a first substrate 100 (FIG. 2) on which gate lines G1 through Gn, data lines D1 through Dm, pixel switching devices Qp (FIG. 2), and pixel electrodes PE (FIG. 2) are disposed, a second substrate 200 (FIG. 2) on which color filters CF (FIG. 2) and a common electrode CE (FIG. 2) are disposed, and a liquid crystal layer 150 interposed between the first substrate 100 and the second substrate 200. The gate lines G1 through Gn extend along a first, substantially row, direction substantially parallel to each other, and the data lines D1 through Dm extend along a second, substantially column direction, substantially parallel to each other and crossing the first direction, e.g., substantially perpendicular to the first direction.

Referring to FIG. 2, each pixel PX includes a color filter CF disposed proximate to the common electrode CE of the second substrate 200 to face the pixel electrode PE of the first substrate 100. The liquid crystal layer 150 is disposed between the first substrate 100 and the second substrate 200. Each pixel PX is connected to an $i^{th}$ (where I=1 to n) gate line Gi and a $j^{th}$ (where j=1 to m) data line Dj. In addition, each pixel PX includes one of the pixel switching devices Qp, which is connected to the $i^{th}$ gate line Gi and the $j^{th}$ data line Dj, and a liquid crystal capacitor Clc and a storage capacitor Cst connected to the pixel switching device Qp. A common voltage may be applied to a terminal of the storage capacitor Cst and the common electrode CE.

The non-display region PA is a region wherein the image is not displayed, e.g., wherein no image is displayed, and corresponds to an area where the first substrate 100 is wider than the second substrate 200.

The timing controller 500 receives input control signals, such as a horizontal synchronization signal Hsync, a vertical synchronization signal Vsync, a main clock signal Mclk, image signals R, G, B and a data enable signal DE, for example, and outputs a first control signal CONT1, for example. The first control signal CONT1 controls an operation of the data driver 700. Examples of the first control signal CONT1 include a horizontal start signal for starting the data driver 700 and a load signal for instructing the output of two data voltages, but alternative exemplary embodiments are not limited thereto.

The data driver 700 receives an image signal DAT and the first control signal CONT1, and provides image data voltages, corresponding to the image signal DAT, to the data lines D1 through Dm. The data driver 700 may be disposed as integrated circuits ("ICs") connected to the liquid crystal panel 300 in a form of a tape carrier package ("TCP"), for example, but alternative exemplary embodiments are not limited thereto. The data driver 700 may be disposed in the non-display region PA of the first substrate 100.

The timing controller 500 provides a second control signal CONT2 to the clock generator 600. The clock generator 600 receives the second control signal CONT2 and outputs a first (1st) signal, which in an exemplary embodiment is a first clock signal, and a second (2nd) signal, which in an exemplary embodiment is a second clock signal, to the gate driver 400, as shown in FIG. 1. Thus, in response to the second control signal CONT2, the clock generator 600 outputs the first clock signal and the second clock signal using a gate-on voltage Von and a gate-off voltage Voff. Examples of the second control signal CONT2 include an output enable signal (not shown) and a gate clock signal (not shown). The first clock signal and the second clock signal are pulse signals that swing between the gate-on voltage Von and the gate-off voltage Voff. In an exemplary embodiment, the first clock signal may be a reverse phase signal of the second clock signal, e.g., may be 180 degrees out of synchronization with the second clock signal.

The gate driver 400 includes the gate driving apparatus according to an exemplary embodiment. When enabled by a scan start signal STVP, the gate driving apparatus generates gate signals using the first clock signal, the second clock signal and the gate-off voltage Voff, and sequentially transmits the gate signals to the gate lines G1 through Gn. The gate driving apparatus of the gate driver 400 may be disposed in the non-display region PA of the first substrate 100.

In an exemplary embodiment, a plurality of the gate drivers 400 (not shown) may be disposed on two sides of the non-display region PA of the first substrate 100. In this case, a gate driver 400 dispose on a first side of the non-display region PA of the first substrate 100 may drive even gate lines of the gate lines G1 through Gn, while a different gate driver 400 disposed on an opposite second side of the non-display region PA may drive odd gate lines of the gate lines G1 through Gn. The gate driving apparatus of the gate driver 400 will now be described in further detail with reference to FIG. 3.

As shown in FIG. 3, the gate driving apparatus of the gate driver 400 according to an exemplary embodiment includes first through $(n+1)^{th}$ stages $ST_1$ through $ST_{n+1}$, where n is a natural number. The first through $(n+1)^{th}$ stages $ST_1$ through $ST_{n+1}$ are connected to each other in a cascade manner, e.g., are connected such that the $(n+1)^{th}$ stage $ST_{+1}$ is subsequent and adjacent to an $n^{th}$ stage $ST_n$, while the (n−1)th stage $ST_{n+1}$ is previous and adjacent to the nth stage $ST_n$. The first through $n^{th}$ stages $ST_1$ through $ST_n$, excluding the last stage $ST_{n+1}$, are connected to the gate lines G1 through Gn, respectively, and output gate signals $Gout_{(1)}$ through $Gout_{(n)}$ to the gate lines G1 through Gn, respectively. The gate-off voltage Voff, the first clock signal, the second clock signal, and an initialization signal INT are inputted to each of the first through $(n+1)^{th}$ stages $ST_1$ through $ST_{n+1}$. In an exemplary embodiment, the initialization signal INT may be provided by the clock generator 600 or, alternatively, by the timing controller 500.

Each of the first through $(n+1)^{th}$ stages $ST_1$ through $ST_{n+1}$ includes a first clock terminal CK1, a second clock terminal CK2, a set terminal S, a reset terminal R, a voltage source terminal GV, a frame reset terminal FR, a gate output terminal OUT1 and a carry output terminal OUT2.

For purposes of explanation, a $j^{th}$ stage $ST_j$, for example, connected to a $j^{th}$ gate line (where j≠1 and is a natural number ranging from 2 through n−1) will now be described in further detail with reference to FIG. 3. In an exemplary embodiment of the present invention, the carry signal $Cout_{(j-1)}$ of a previous (former) stage, e.g., the $(j-1)^{th}$ stage $ST_{j-1}$, is inputted to the set terminal S of the $j^{th}$ stage $ST_j$, the gate signal $Gout_{(j+1)}$ of a subsequent (latter) stage, e.g., the $(j+1)^{th}$ stage $ST_{j+1}$, is inputted to the reset terminal R of the $j^{th}$ stage $ST_j$, and the first clock signal and the second clock signal are inputted to the first clock terminal CK1 and the second clock terminal CK2, respectively, of the $j^{th}$ stage $ST_j$.

In addition, the gate-off voltage Voff is inputted to the voltage source terminal GV of the $j^{th}$ stage $ST_j$, and the initialization signal INT or, alternatively, a carry signal $Cout_{(n+1)}$ of a last stage, e.g., the $(n+1)^{th}$ stage $ST_{n+1}$, is inputted to the frame reset terminal FR of the $j^{th}$ stage $ST_j$. The gate output terminal OUT1 outputs the gate signal $Gout_{(j)}$, and the carry output terminal OUT2 outputs a carry signal $Cout_{(j)}$.

However, the scan start signal STVP, instead of a carry signal of a previous stage of the first stage $ST_1$, is inputted to the first stage $ST_1$, as shown in FIG. 3. In addition, the scan start signal STVP, instead of a gate signal of a next stage of the $(n+1)^{th}$ stage $ST_{n+1}$, is inputted to the last stage $ST_{n+1}$. The scan start signal STVP, inputted to the first stage $ST_1$, is substantially the same as the scan start signal STVP inputted to the last stage $ST_{n+1}$.

The $j^{th}$ stage $ST_j$ shown in FIG. 3 will now be described in further detail with reference to FIGS. 4 and 5. Referring to FIG. 4, the $j^{th}$ stage $ST_j$ include a buffer unit 410, a charging unit 420, a first output unit 430, a carry signal generation unit 470, a second output unit 440, a discharging unit 450, a holding unit 460 and antistatic units 480 and 482. The carry signal $Cout_{(j-1)}$ of the previous stage $ST_{j-1}$, the first clock signal, and the second clock signal are provided to the $j^{th}$ stage $ST_j$. The first clock signal includes a first high-level section PH_1 and a second high-level section PH_2, as well as a first low-level section PL _1 and a second low-level section PL_2.

The buffer unit 410 includes a transistor T4. A gate and a drain of the transistor T4 are connected to the set terminal S of the $j^{th}$ stage $ST_j$. In addition, the gate and the drain of the transistor T4 are connected to each other. Accordingly, the transistor T4 operates substantially as a diode. The buffer unit 410 provides the carry signal $Cout_{(j-1)}$ of the previous stage $ST_{j-1}$, which is received through the set terminal S, to the charging unit 420, the carry signal generation unit 470 and the first output unit 430.

The charging unit 420 includes a charging capacitor C1 including a first terminal, connected to a source electrode of the transistor T4, the first output unit 430 and the discharging unit 450, and a second terminal connected to the gate output terminal OUT1. Further, the charging capacitor C1 may be a parasitic capacitor between a gate electrode and a source electrode or may be intentionally formed.

The first output unit 430 includes a gate driving thin-film transistor ("TFT") T1. The gate driving TFT T1 includes a drain electrode connected to the first clock terminal CK1, a gate electrode connected to the charging unit 420 and a source electrode connected to the gate output terminal OUT1.

The carry signal generation unit 470 includes a transistor T15 and a capacitor C2. The transistor T15 includes a drain electrode connected to the first clock terminal CK1, a source electrode connected to the carry output terminal OUT2 and a gate electrode connected to the buffer unit 410. In addition, the capacitor C2 is connected to the gate electrode and the source electrode of the transistor T15.

The second output unit 440 includes a transistor T2 including a drain electrode connected to the source electrode of the transistor T1 and the second terminal of the charging capacitor C1, a source electrode connected to the voltage source terminal GV, and a gate electrode connected to the reset terminal R. In an exemplary embodiment, the gate electrode receives the gate signal $Gout_{(j+1)}$ of the next stage $ST_{j+1}$ and controls the transistor T2. The second output unit 440 may be connected to the antistatic unit 480 which protects the second output unit 440 from static electricity. The antistatic unit 480 will be described in further detail below.

The discharging unit 450 includes transistors T6 and T9. The transistor T9 includes a gate electrode connected to the reset terminal R, a drain electrode connected to the first terminal of the charging capacitor C1 and a source electrode connected to the voltage source terminal GV. The transistor T9 discharges the charging unit 420 in response to the gate signal Gout($_{j+1)}$ of the next stage $ST_{(j+1)}$. The transistor T6 includes a gate electrode connected to the frame reset terminal FR, a drain electrode connected to the first terminal of the charging capacitor C1 and a source electrode connected to the voltage source terminal GV. The transistor T6 discharges the charging unit 420 in response to the initialization signal INT.

In a conventional gate driving apparatus, static electricity flows to the transistor T9 of the discharging unit 450, which discharges the charging unit 420 in response to the gate signal $Gout_{(j+1)}$ of the next stage $ST_{(j+1)}$. However, exemplary embodiments include the antistatic unit 482 connected to the transistor T9, and the discharging unit 450 is therefore prevented from being damaged by static electricity, as described in greater detail below.

The holding unit 460 includes transistors T3, T5, T7, T8, T10, T11, T12 and T13. When the gate signal $Gout_{(j)}$ shifts from a low level to a high level, the holding unit 460 holds the gate signal $Gout_{(j)}$ at the high level. Likewise, when the gate signal $Gout_{(j)}$ shifts from a high level to a low level, the holding unit 460 holds the gate signal $Gout_{(j)}$ at the low level during a frame, without regard to voltage levels of the first clock signal and the second clock signal.

An operation of the above-described units will now be described in further detail with reference to FIGS. 4 and 5.

A process in which the gate signal $Gout_{(j)}$ is converted from the gate-off voltage Voff to the gate-on voltage Von will now be described in further detail.

The charging unit 420 receives the carry signal $Cout_{j-1)}$ of the previous stage $ST_{j-1)}$ and is therefore charged with electric charges. More specifically, for example, the charging unit 420 charges after receiving the carry signal $Cout_{(j-1)}$ of the previous stage $ST_{j-1}$ in the first low-level section PL_1, and thus a voltage at a node N1 (e.g., a pull-up node N1) gradually increases. As the first clock signal, at a high level, is outputted as the gate signal $Gout_{(j)}$, the voltage at the node N1 (the pull-up node N1) is boosted up by the charging capacitor C1.

When the voltage of the charging unit 420, e.g., the voltage at the node N1 (the pull-up node N1), is increased to a positive voltage, the gate driving transistor T1 of the first output unit 430 is turned on and thus provides the first clock signal, received via the first clock terminal CK1, as the gate signal $Gout_{(j)}$ through the gate output terminal OUT1. Thus, a level of the gate signal $Gout_{(j)}$ becomes the level of the gate-on voltage Von. In addition, the transistor T15 of the carry signal generation unit 470 is turned on and outputs the first clock signal as the carry signal $Cout_{(j)}$ through the carry output terminal OUT2.

When the level of the gate signal $Gout_{(j)}$ is the level of the gate-on voltage Von, the transistors T8 and T13 are turned on. The transistor T13 turns off the transistor T7 to block the first clock signal, at the high level, from being provided to the transistor T3, and the transistor T8 turns off the transistor T3. Therefore, the transistors T8 and T13 prevent the transistor T3 from pulling down the gate signal $Gout_{(j)}$ to the gate-off voltage Voff.

A process in which the gate signal $Gout_{(j)}$ is converted from the gate-on voltage Von to the gate-off voltage Voff will now be described in further detail.

In the second low-level section PL_2, e.g., when the first clock signal transitions from the high level to the low level, the voltage at the node N1 (the pull-up node N1) is lowered by parasitic capacitance. In addition, when the gate signal $Gout_{(j+1)}$ of the next stage $ST_{(j+1)}$ goes high, the transistor T9 of the discharging unit 450 is turned on to provide the gate-off voltage Voff to the node N1 (the pull-up node N1). However, since the second clock signal transits from the low level to the high level, the transistor T11 of the holding unit 460 is turned on to provide the carry signal $Cout_{(j-1)}$ of the previous stage $ST_{j-1}$, which is a positive voltage, to the node N1 (the pull-up node N1). Thus, the voltage at the node N1 (the pull-up node N1) does not dramatically drop to the gate-off voltage Voff, but instead gradually decreases (as illustrated in FIG. 5) since the carry signal $Cout_{(j-1)}$ of the previous stage $ST_{(j-1)}$, which is a positive voltage, is provided to the node N1 (the pull-up node N1) even though the discharging unit 450 provides the gate-off voltage Voff to the node N1 (the pull-up node N1). The carry signal $Cout_{(j-1)}$ of the previous stage $ST_{j-1}$ is maintained as a positive voltage by the capacitor C2 of the carry signal generation unit 470 of the previous stage $ST_{j-1}$.

Accordingly, when the gate signal $Gout_{(j+1)}$ of the next stage $ST_{(j+1)}$ goes high, the gate driving transistor T1 of the first output unit 430 is not turned off and outputs the first clock signal at a low level as the gate signal $Gout_{(j)}$. In addition, when the gate signal Gout($_{j+1)}$ of the next stage $ST_{(j+1)}$ goes high, the transistor T2 of the second output unit 440 is turned on to provide the gate-off voltage Voff to the gate output terminal OUT1. Accordingly, the level of the gate signal $Gout_{(j)}$ is rapidly pulled down to the level of the gate-off voltage Voff, since the second output unit 440 drops the gate signal $Gout_{(j)}$ to the gate-off voltage Voff and the first output unit 430 provides the first clock signal at a low level as the gate signal $Gout_{(j)}$. Therefore, the gate signal $Gout_{(j)}$ does not overlap the gate signal $Gout_{(j+1)}$ of the next stage $ST_{(j+1)}$.

A process in which the gate signal $Gout_{(j)}$ is maintained as the gate-off voltage Voff for a frame after being pulled down to the gate-off voltage Voff will now be described in greater detail.

After the gate signal $Gout_{(j)}$ shifts from the high level to the low level, the transistors T8 and T13 are turned off. When the first clock signal is high, the transistors T7 and T12 turn on the transistor T3, thereby maintaining the gate signal $Gout_{(j)}$ at the low level. The transistor T10 is turned on to maintain the node N1 (the pull-up node N1) at the low level. In addition, the second clock signal goes high, and the transistors T5 and T11 are thereby turned on. The turned-on transistor T5 maintains the gate signal $Gout_{(j)}$ at the low level, and the turned-on transistor T11 maintains the node N1 (the pull-up node N1) at the low level.

Figure 6:
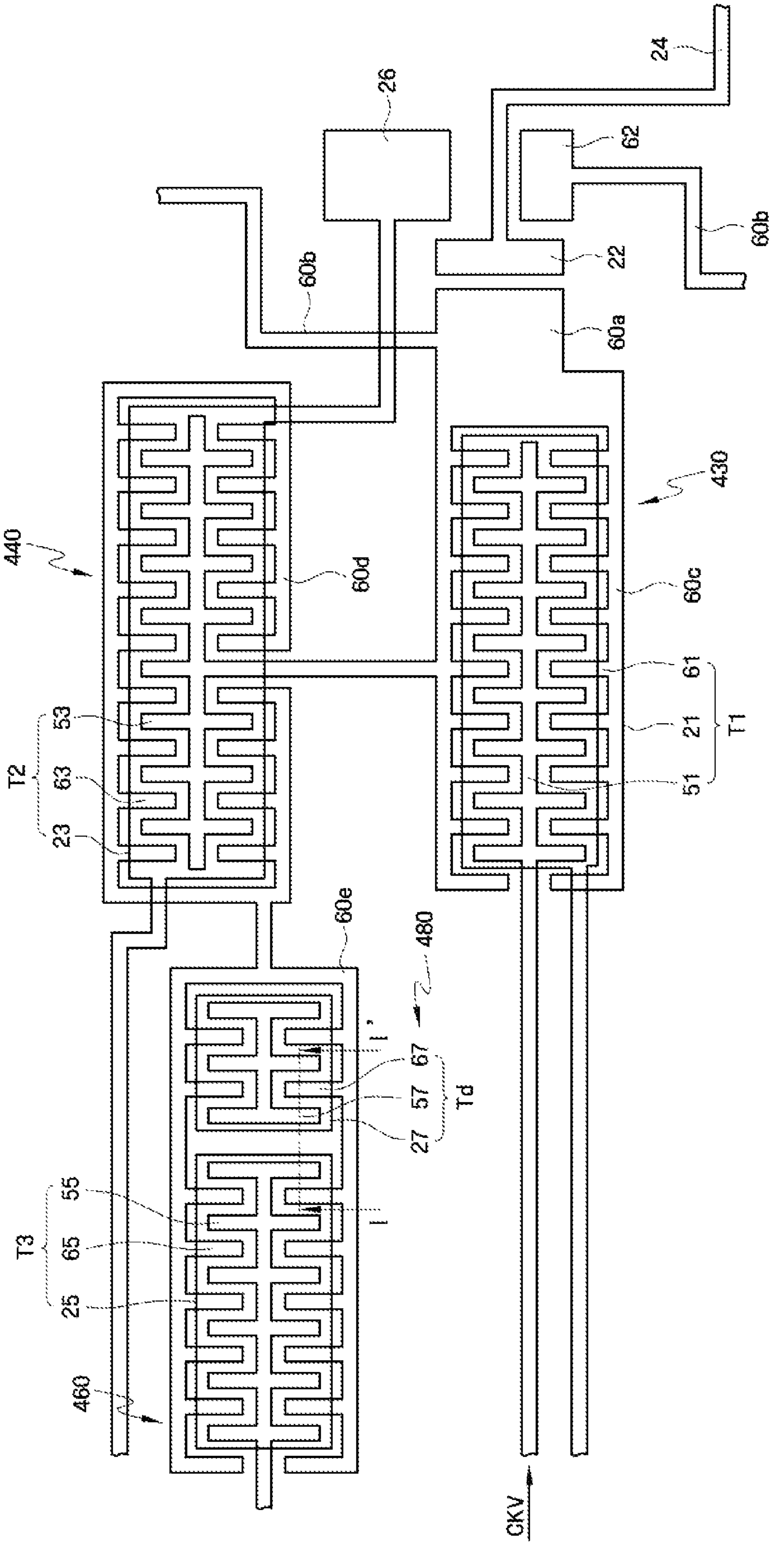
FIG. 6 is a plan view of a portion of a $j^{th}$ stage of an exemplary embodiment of a gate driving apparatus according to the present invention.
Figure 7:
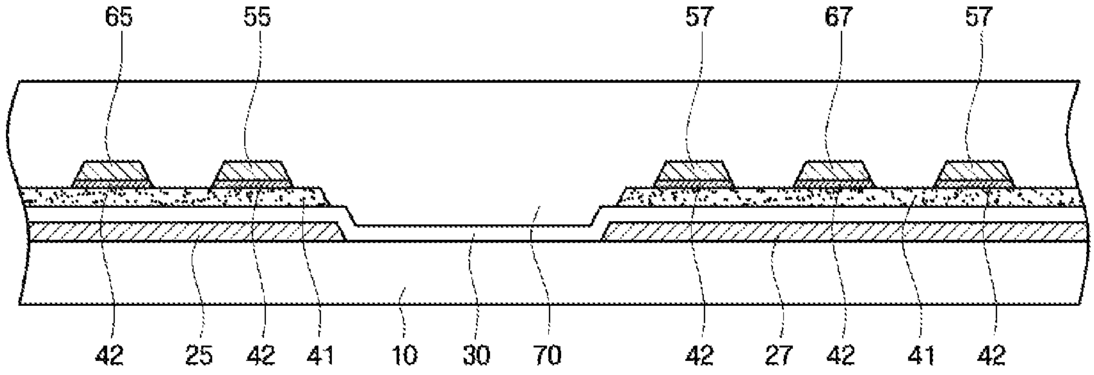
FIG. 7 is a partial cross-sectional view taken along line I-I' of FIG. 6.
Figure 8:
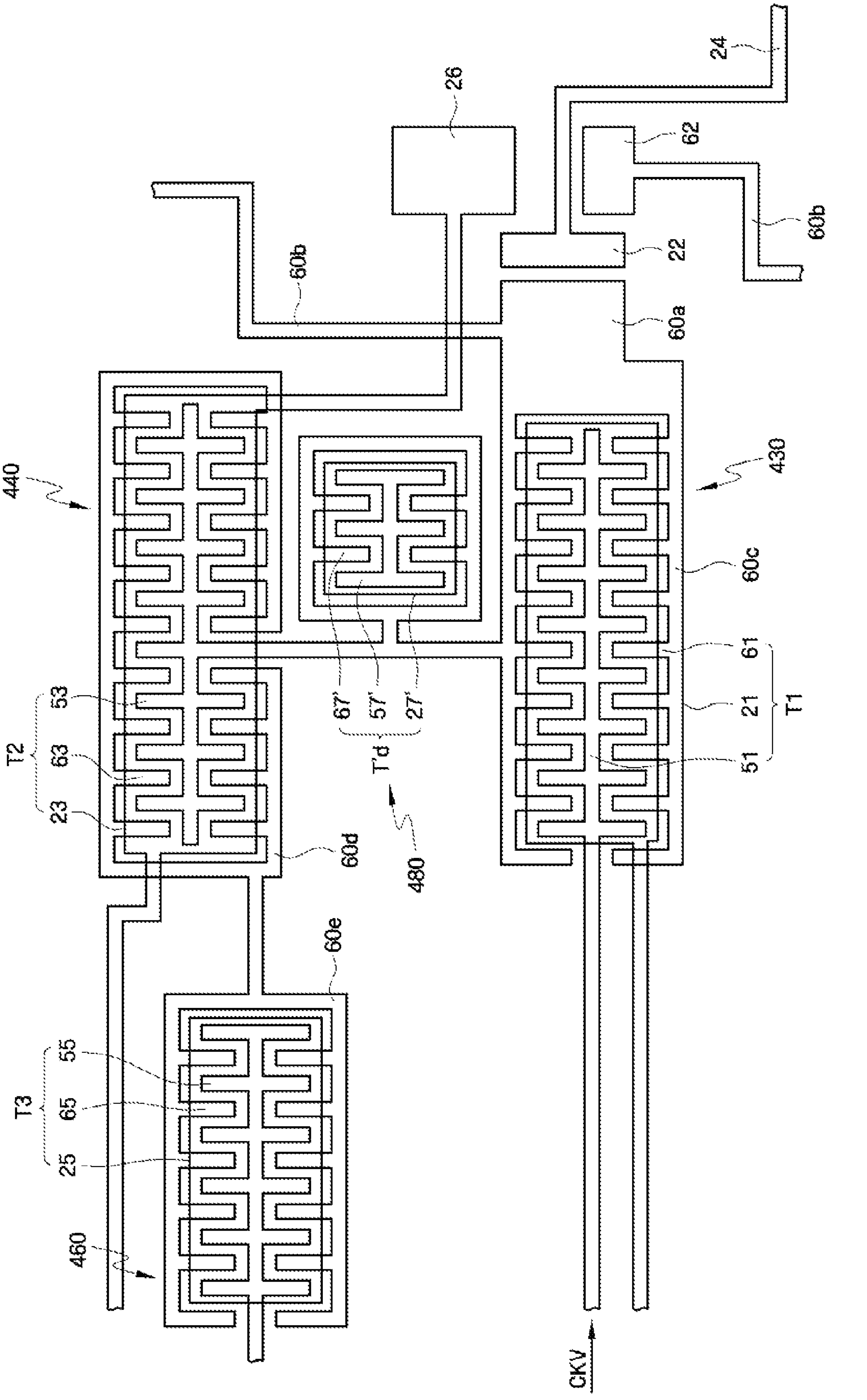
FIG. 8 is a plan view of a portion of a $j^{th}$ stage of another exemplary embodiment of a gate driving apparatus according to the present invention.

Hereinafter, an antistatic unit included in a gate driving apparatus according to an exemplary embodiment will be described in further detail with reference to FIGS. 6 through 8. FIG. 6 is a plan view of a portion of a $j^{th}$ stage of the gate driving apparatus according an exemplary embodiment. FIG. 7 is a partial cross-sectional view taken along line I-I' of FIG. 6. FIG. 8 is a plan view of a portion of a $j^{th}$ stage of another exemplary embodiment of a gate driving apparatus. The same or like components of the exemplary embodiments described in further detail above with reference to FIGS. 1 through 5 are identified by the same reference characters in FIGS. 6 through 8, and any repetitive detailed description thereof will hereinafter be omitted.

Hereinafter, the gate driving transistor T1 of the first output unit 430 shown in FIG. 4 will be referred to as a "first transistor" T1 (FIG. 6), the transistor T2 of the second output unit 440 shown in FIG. 4 will be referred to as a "second transistor" T2 (FIG. 6), the transistor T3 of the holding unit 460 shown in FIG. 4 will be referred to as a "third transistor" T3 (FIG. 6), and the transistor of the antistatic units 480 and/or 482 shown in FIG. 4 will be referred to as a "dummy transistor" Td (FIG. 6).

Referring to FIGS. 6 and 7, the $j^{th}$ stage $ST_j$ of the gate driving apparatus according to an exemplary embodiment includes: a first gate electrode 21, a second gate electrode 23, a third gate electrode 25 and a dummy gate electrode 27; a first drain electrode 51, a second drain electrode 53, a third drain electrode 55 and a dummy drain electrode 57; a first source electrode 61, a second source electrode 63, a third source electrode 65 and a dummy source electrode 67; a source electrode contact unit 60*a;* a gate line contact unit 22; a first pad 62; and a second pad 26 disposed on a substrate 10.

The first transistor T1 of the first output unit 430 includes the first gate electrode 21, the first drain electrode 51, and the first source electrode 61.

In an exemplary embodiment, the first drain electrode 51 may be shaped substantially like a fishbone antenna, e.g., collinear pairs of coplanar elements disposed along and extending from a central portion perpendicular to and coplanar with the pairs, and may overlap the first gate electrode 21, as shown in FIG. 6. A second source or drain line 60*c* surrounds at least a portion of the first drain electrode 51, and the first source electrode 61 branches off from, e.g., extends substantially perpendicularly from, the second source or drain line 60*c* to face the first drain electrode 51. In an exemplary embodiment, the first source electrode 61 may overlap at least a portion of the first gate electrode 21. Portions of the first drain electrode 51 and the first source electrode 61 may be substantially cross finger-shaped, e.g., may be interdigitated, as shown in FIG. 6.

The first source electrode 61 provides a gate output signal. The source electrode contact unit 60*a*, connected to the first source electrode 61, delivers the gate output signal to the gate line contact unit 22. Since the gate line contact unit 22 and a gate line 24 are connected to each other, the gate output signal is transmitted to each pixel PX (FIG. 1) of a display region DA (FIG. 1) through the gate line 24. In addition, a first gate output signal of a first stage, e.g., a $j^{th}$ stage (a current stage), is delivered to a previous stage, e.g., a $(j-1)^{th}$ stage, through the source electrode contact unit 60*a* and a first source or drain line 60*b* connected to the source electrode contact unit 60*a*. In an exemplary embodiment, the source electrode contact unit 60*a* and the gate line contact unit 22 are connected to each other by a bridge line, as will be described in further detail below.

The second transistor T2 of the second output unit 440 includes the second gate electrode 23, the second drain electrode 53, and the second source electrode 63.

The second gate electrode 23 is connected to the second pad 26, and the second pad 26 is connected to the first pad 62 which receives a gate output signal of a second stage, e.g., a $(j+1)^{th}$ stage (a next stage). Accordingly, the second gate electrode 23 receives a second gate output signal of the $(j+1)^{th}$ stage, e.g., the second stage.

The second drain electrode 51 is connected to the first source electrode 61 of the first transistor T1 by the second source or drain line 60*c*. A structure of the second transistor T2 is substantially the same as that of the first transistor T1, except that the second source electrode 63 branches off from, e.g., extends from, a third source or drain line 60*d,* and thus any repetitive detailed description thereof will hereinafter be omitted.

The third transistor T3 of the holding unit 460 includes the third gate electrode 25, the third drain electrode 55 and the third source electrode 65.

A structure of the third transistor T3 is substantially the same as that of the first transistor T1, except that the third source electrode 65 branches off from, e.g., extends from, a fourth source or drain line 60*e*, and thus any repetitive detailed description thereof will hereinafter be omitted. The fourth source or drain line 60*e* is connected to the third source or drain line 60*d*. As a result, the third transistor T3 is connected to the second transistor T2.

Static electricity is generated in the first pad 62 and the gate line 24 disposed on a side of the first output unit 430 by electric charges that accumulate while the gate driving apparatus is manufactured. In addition, static electricity is generated in the second pad 26 and the gate line contact unit 22. As a result, the static electricity may flow into the $j^{th}$ stage through a wiring layer of the first transistor T1 of the first output unit 430 adjacent to the first pad 62, the gate line 24, the second pad 26 and the gate line contact unit 22. Put another way, once the static electricity flows to the first transistor T1, it flows to the second transistor T2 connected to the first transistor T1. In addition, when the static electricity flows to the second transistor T2, it flows into the $j^{th}$ stage through the third transistor T3 connected to the second transistor T2. The static electricity flowing into the $_j{}^{th}$ stage burns a transistor within the $j^{th}$ stage, thereby causing the transistor to malfunction. Consequently, performance of the $j^{th}$ stage is degraded unless the static electricity is effectively prevented from flowing, as in an exemplary embodiment described herein.

More specifically, static electricity flows into the second transistor T2 of the second output unit 440, which directly receives the gate output signal of the next stage, e.g., the $(j+1)^{th}$ stage, through the first pad 62 and the second pad 26, and the third transistor T3 of the holding unit 460 which is connected to the second transistor T2. In addition, static electricity flows into a transistor T9 (FIG. 4) of a discharging unit 450 (FIG. 4) which directly receives the gate output signal of the $(j+1)^{th}$ stage through the first pad 62 and the second pad 26. Accordingly, the second transistor T2 of the second output unit 440, the third transistor T3 of the holding unit 460, and the transistor T9 (FIG. 4) of the discharging unit 450 (FIG. 4) are particularly vulnerable to damage from static electricity. Accordingly, the second output unit 440, the holding unit 460 and/or the discharging unit 450 (FIG. 4) according to exemplary embodiments include antistatic units to protect the abovementioned units from static electricity. Thus, each stage of an exemplary embodiment may include a signal reception unit which receives a gate output signal and an antistatic unit which is connected to the signal reception unit and prevents static electricity from flowing into each stage.

Referring to FIGS. 6 and 7, an antistatic unit 480 according to an exemplary embodiment is disposed adjacent to the third transistor T3 of the holding unit 460 such that it is included in the holding unit 460. The antistatic unit 480 according to an exemplary embodiment includes the first dummy transistor Td. The first dummy transistor Td includes the dummy gate electrode 27, the dummy drain electrode 57, and the dummy source electrode 67.

The dummy gate electrode 27 may be disposed on the substrate 10 adjacent to the second gate electrode 23 and/or the third gate electrode 25 and between the second gate electrode 23 and the third gate electrode 25. In an exemplary embodiment, the dummy gate electrode 27 is not electrically connected to the other components, e.g., gate electrodes 21, 23 and 25 on the substrate 10. Instead, the dummy gate electrode 27 is insulated from the other gate electrodes 21, 23, and 25. Put another way, the dummy gate electrode 27 electrically floats, e.g., is electrically floated as described above.

A gate-insulating film 30 and a semiconductor layer 41 are disposed on the dummy gate electrode 27.

The dummy drain electrode 57 is disposed above the semiconductor layer 41 to overlap at least a portion of the dummy gate electrode 27. An ohmic contact layer 42 may be interposed between the dummy drain electrode 57 and the semiconductor layer 41. Like the first drain electrode 51, the dummy drain electrode 57 may be shaped substantially like a fishbone antenna, as described in greater detail above and shown in FIG. 6. In an exemplary embodiment, the dummy drain electrode 57 is not electrically connected to other components, e.g., to the other source and drain electrodes 51, 53, 55, 61, 63, and 65 on the substrate 10. Instead, the dummy drain electrode 57 is insulated from the other source and drain electrodes 51, 53, 55, 61, 63, and 65, e.g., the dummy drain electrode 57 is electrically floated.

The dummy source electrode 67 may branch off from, e.g., extend from, the fourth source or drain line 60*e* and overlap at least a portion of the dummy gate electrode 27. In addition, the dummy source electrode 67 may face the dummy drain electrode 57. Portions of dummy drain electrode 57 and the dummy source electrode 67 may be interdigitated.

Since the fourth source or drain line 60*e* is connected to the third source or drain line 60*d*, the dummy source electrode 67 of the first dummy transistor Td is connected to the second source electrode 63 of the second transistor T2. Accordingly, static electricity does not flow from the second transistor T2 of the second output unit 440 to the third transistor T3 of the holding unit 460, but instead flows to the first dummy transistor Td of the antistatic unit 480. Thus, static electricity which in, a conventional gate driving apparatus would flow into the third transistor T3, instead flows into the first dummy transistor Td, thereby effectively preventing the first dummy transistor Td from being damaged, e.g., burned. Thus, in an exemplary embodiment, static electricity is effectively prevented from flowing into a stage including an antistatic unit. Accordingly, a transistor within the stage is effectively prevented from being damaged by the static electricity, which, in turn, effectively prevents deterioration of a performance of the stage due to the static electricity.

Referring to FIG. 8, an antistatic unit 480 is disposed adjacent to the second transistor T2 of the second output unit 440 such that the antistatic unit 480 is included in the second output unit 440. The antistatic unit 480 according to an exemplary embodiment includes a second dummy transistor T'd. The second dummy transistor T'd includes a dummy gate electrode 27', a dummy drain electrode 57', and a dummy source electrode 67'. A structure and function of the second dummy transistor T'd are substantially the same as those of the first dummy transistor Td, described above, except that the dummy source electrode 67' branches off from, e.g., extends from, a second source or drain line 60*c*, and thus any repetitive detailed description thereof will hereinafter be omitted. The second dummy transistor T'd according to an exemplary embodiment effectively prevents flow of static electricity from the first transistor T1 to the second transistor T2.

In another exemplary embodiment, an antistatic unit 482 (FIG. 4) may be connected to the source electrode or the drain electrode of the transistor T9 (FIG. 4) of the discharging unit 450 (FIG. 4). The antistatic unit 482 may include a dummy transistor (not shown) as the one described above. Thus, static electricity which flows into the discharging unit 450 (FIG. 4) is effectively removed.

In an exemplary embodiment, the dummy transistor Td of each of antistatic units 480 and 482 may be formed in a substantially mesh pattern, as shown in FIGS. 6 and 8.

Figure 9:
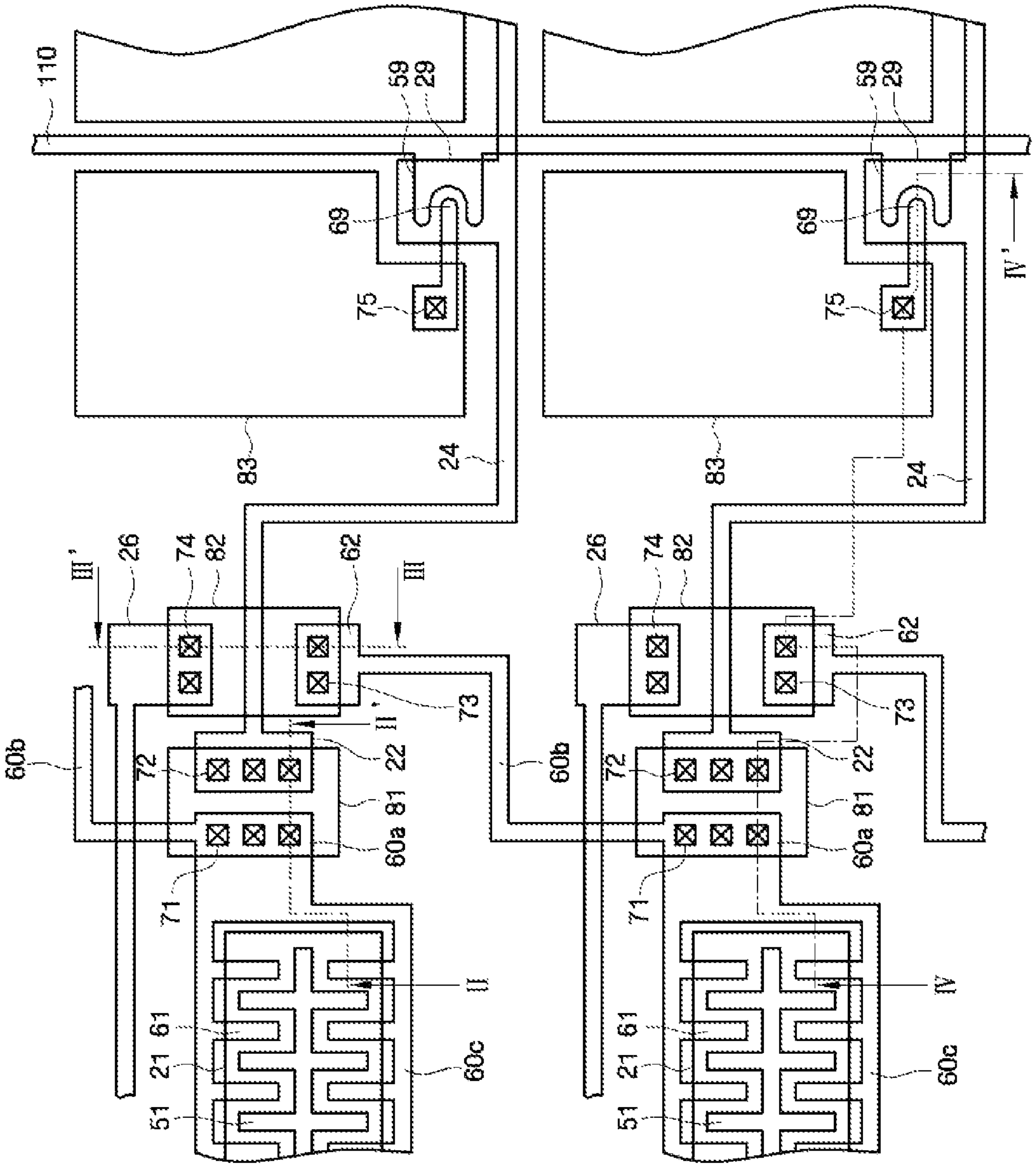
FIG. 9 is a plan view of portions of $j^{th}$ and $(j+1)^{th}$ stages of another exemplary embodiment of a gate driving apparatus according to the present invention.
Figure 10:
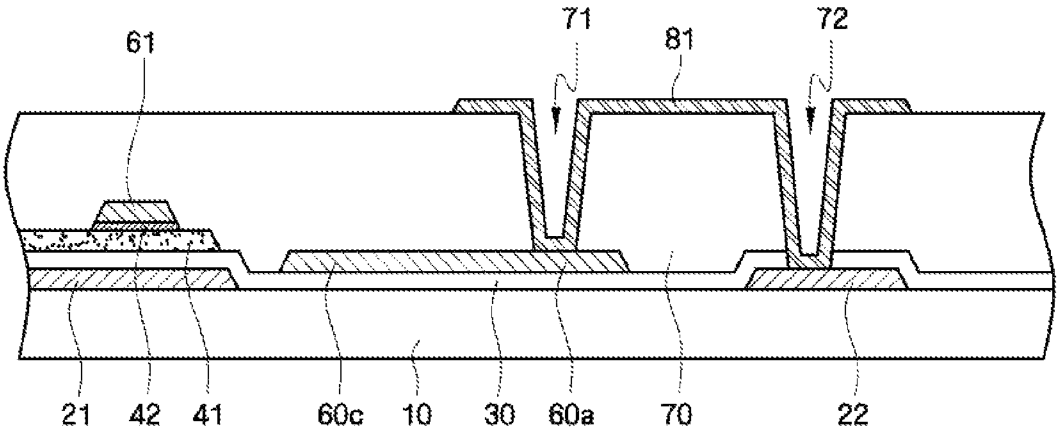
FIG. 10 is a partial cross-sectional view taken along line II-II' of FIG. 9.
Figure 11:
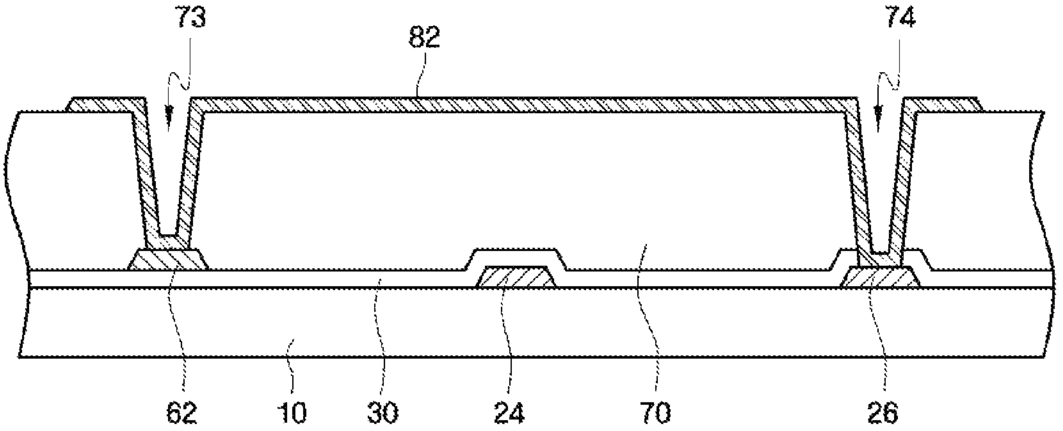
FIG. 11 is a partial cross-sectional view taken along line III-III' of FIG. 9.
Figure 12:
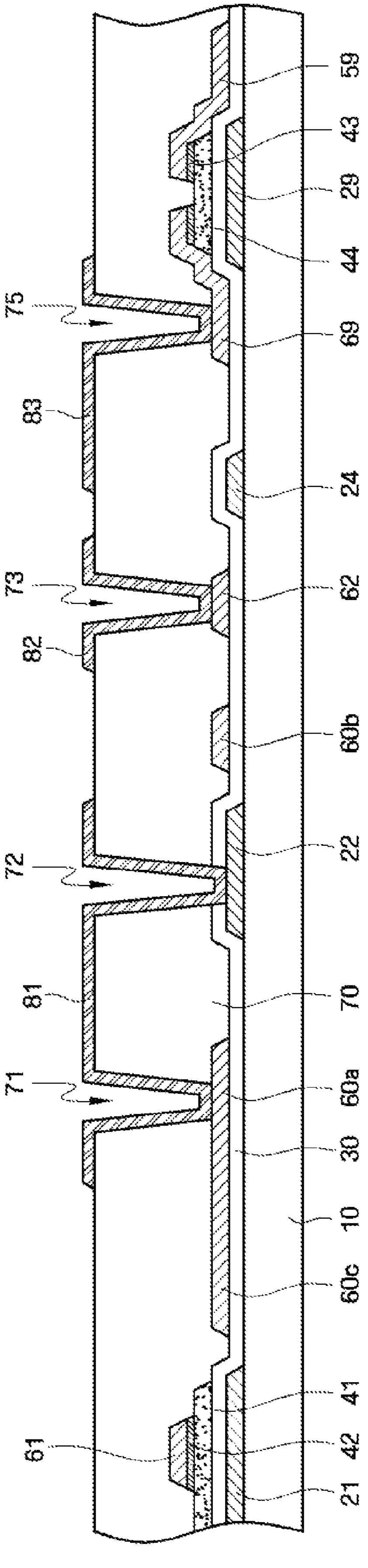
FIG. 12 is a partial cross-sectional view taken along line IV-IV' of FIG. 9.

Hereinafter, a wiring structure of a gate driving apparatus according to another exemplary embodiment will be described in further detail with reference to FIGS. 9 through 12. FIG. 9 is a plan view of portions of $j^{th}$ and $(j+1)^{th}$ stages of another exemplary embodiment of a gate driving apparatus. FIG. 10 is a partial cross-sectional view taken along the line II-II' FIG. 9. FIG. 11 is a partial cross-sectional view taken along line III-III' of FIG. 9. FIG. 12 is a partial cross-sectional view taken along line IV-IV' of FIG. 9. The same or like components of the exemplary embodiments described in further detail above with reference to FIGS. 1 through 8 are identified by the same reference characters in FIGS. 9 through 12, and any repetitive detailed description thereof will hereinafter be omitted.

Referring to FIG. 9, a gate driving apparatus according to another exemplary embodiment includes a source electrode contact unit 60*a*, a gate line contact unit 22, a first source or drain line 60*b*, a first pad 62, a second pad 26, a gate line 24, a first bridge line 81 and a second bridge line 82.

Referring to FIGS. 9, 10 and 12, the source electrode contact unit 60*a* is connected to a second source or drain line 60*c* of a first transistor T1. The second source or drain line 60*c* may extend substantially along a direction of a display region such that it is integrally formed with the source electrode contact unit 60*a*. The first source or drain line 60*b* is connected to the source electrode contact unit 60*a*. Thus, a gate output signal provided by a first source electrode 61 of the first transistor T1 is delivered to a previous stage, e.g., a $(j-1)^{th}$ stage, via the first source or drain line 60*b*.

The source electrode contact unit 60*a* and the gate line contact unit 22 are connected. Thus, the gate output signal provided by the first source electrode 61 is delivered to a gate electrode 29 formed in each pixel of the display region. The source electrode contact unit 60*a* is disposed on a gate-insulating film 30, and the gate line contact unit 22 is disposed under the gate-insulating film 30. However, the source electrode contact unit 60*a* is electrically connected to the gate line contact unit 22 by the first bridge line 81. Thus, while a passivation layer 70 is disposed on the source electrode contact unit 60*a* and the gate-insulating film 30, a first contact hole 71 and a second contact hole 72 are formed in the passivation layer 70 and the gate-insulating film 30 to connect the source electrode contact unit 60*a* and the gate line contact unit 22 using the first bridge line 81. The first bridge line 81 is disposed on the passivation layer 70.

The gate line 24 is connected to the gate line contact unit 22. Thus, a gate output signal, which is received from the source electrode contact unit 60*a* via the first bridge line 81, is delivered to the gate electrode 29 formed in each pixel via the gate line 24.

Referring to FIGS. 9, 11 and 12, the first pad 62 receives a gate output signal of a next stage, e.g., the $(j+1)^{th}$ stage. To receive the gate output signal of the $(j+1)^{th}$ stage, the first pad 62 is connected to the first source or drain line 60*b* of the $(j+1)^{th}$ stage.

When the first pad 62 is disposed on a first side of the gate line 24, the second pad 26 is disposed on a second side, opposite the first side, of the gate line 24. The second pad 26 is connected to the first pad 62 and thus receives the gate output signal of the $(j+1)^{th}$ stage. In addition, the second pad 26 is connected to a second gate electrode 63 of a second transistor T2. Accordingly, the gate output signal of the $(j+1)^{th}$ stage may be transmitted to the second gate electrode 63. The first pad 62 and the second pad 26 are electrically connected by the second bridge line 82.

The first pad 62 is disposed on the gate-insulating film 30. The second pad 26 is disposed under the gate-insulating film 30, e.g., in a same layer (e.g., level) as the gate electrode 21. The passivation layer 70 is disposed on the first pad 62. The gate-insulating film 30 and the passivation layer 70 are disposed on the second pad 26. To connect the first pad 62 and the second pad 26 using the second bridge line 82, a third contact hole 73 is formed on the first pad 62, and a fourth contact hole 74 is formed on the second pad 26. Due to the third contact hole 73 and the fourth contact hole 74, the first pad 62 and the second pad 26 are connected by the second bridge line 82. The second bridge line 82 is disposed on the passivation layer 70. In addition, as shown in FIGS. 9 and 12, a source electrode 59 extends from a data line 110 over the gate electrode 29, while a drain electrode 69 is connected to the pixel electrode 83 via a fifth contact hole 75.

Figure 13:
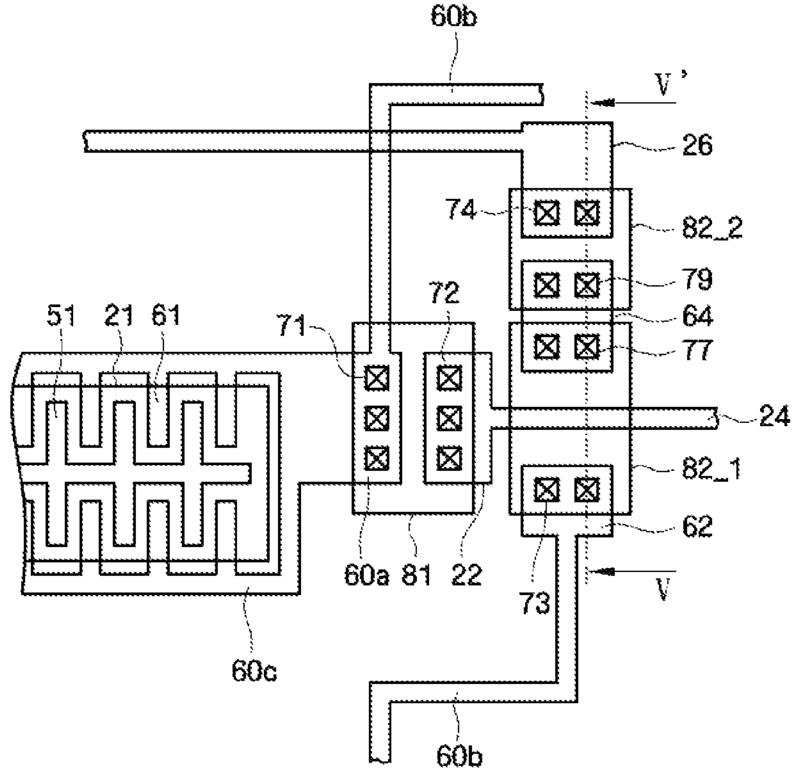
FIG. 13 is a plan view of a portion of a $j^{th}$ stage of yet another exemplary embodiment of a gate driving apparatus according to the present invention.
Figure 14:
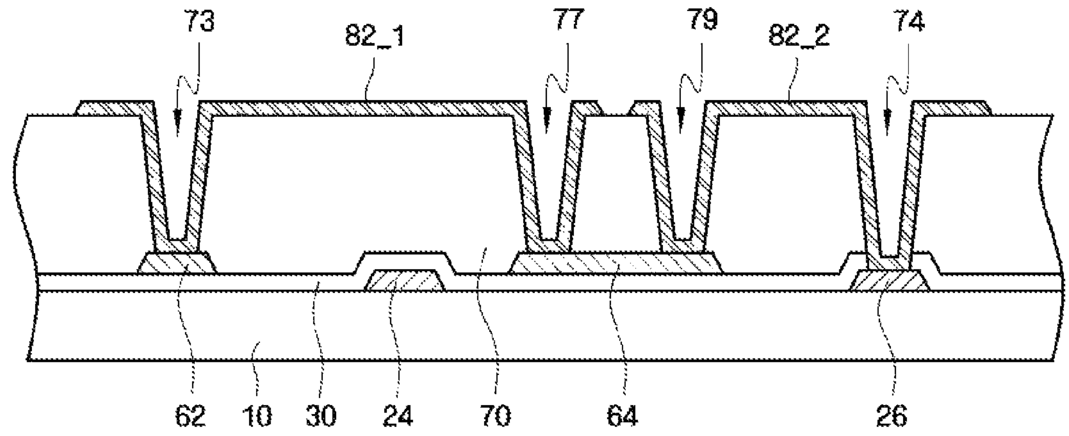
FIG. 14 is a partial cross-sectional view taken along line V-V' of FIG. 13.

In a conventional gate driving apparatus, the first source or drain line 60*b* and the gate line 24 overlap each other with the gate-insulating film 30 interposed therebetween, thereby causing static electricity to be generated. However, in an exemplary embodiment, the first source or drain line 60*b* and the gate line 24 do not directly overlap each other, thereby effectively preventing generation of static electricity. In addition, since the gate-insulating film 30 and the passivation layer 70 are interposed between the second bridge line 82 and the gate line 24, generation of static electricity between the second bridge line 82 and the gate line 24 is substantially reduced and/or is effectively minimized Hereinafter, a wiring structure of a gate driving apparatus according to another exemplary embodiment invention will be described in further detail with reference to FIGS. 13 and 14. FIG. 13 is a plan view of a portion of a $j^{th}$ stage of yet another exemplary embodiment of a gate driving apparatus. FIG. 14 is a partial cross-sectional view taken along line V-V' of FIG. 13. The same or like components of the exemplary embodiments described in further detail above with reference to FIGS. 1 through 12 are identified by the same reference characters in FIGS. 13 and 14, and any repetitive detailed description thereof will hereinafter be omitted.

Referring to FIGS. 13 and 14, a dummy pad 64 is further disposed between a gate line 24 and a second pad 26. In an exemplary embodiment, the dummy pad 64 is disposed on a gate-insulating film 30. A first pad 62, the dummy pad 64, and the second pad 26 may be connected to each other by a third bridge line 82_1 and a fourth bridge line 82_2 into which a second bridge line 82 is divided. Accordingly, a sixth contact hole 77 and a seventh contact hole 79 are formed in a passivation layer 70 on the dummy pad 64. A third contact hole 73 and the sixth contact hole 77 allow the first pad 62 and the dummy pad 64 to be connected by the third bridge line 82_1. In addition, the seventh contact hole 79 and a fourth contact hole 74 allow the dummy pad 64 and the second pad 26 to be connected to each other by the fourth bridge line 82_2. Accordingly, a gate output signal of a next stage, e.g., a $(j+1)^{th}$ stage, which is received by the first pad 62, is delivered to the second pad 26 via the dummy pad 64.

Since the dummy pad 64 divides the second bridge line 82 into two parts, an increase in resistance resulting from an increased length of the second bridge line 82 is substantially reduced and/or is effectively prevented. Accordingly, a voltage drop of the gate output signal of the $(j+1)^{th}$ stage which is applied to a second transistor T2 is substantially reduced and/or is effectively prevented.

In an exemplary embodiment, the first bridge line 81, the second bridge line 82, the third bridge line 81_1 and/or the fourth bridge line 82_2 may be formed of a transparent conductive material that forms a pixel electrode 83. In addition, the first bridge line 81, the second bridge line 82, the third bridge line 81_1 and/or the fourth bridge line 82_2 may be formed at a same time as the pixel electrode 83.

A gate driving apparatus according exemplary embodiments as described herein is integrated onto a non-display region of a substrate. Thus, additional parts, such as a printed circuit board ("PCB"), for example, are required, thereby substantially reducing manufacturing costs of the gate driving apparatus and a display device including the same.

The exemplary embodiments described herein should be considered in a descriptive sense only and not for purposes of limitation. In addition, the present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described herein with reference to exemplary embodiments thereof, it will be understood by those of ordinary skill in the art that various changes in form and detail may be made therein without departing from the spirit or scope of the present invention as defined by the following claims

What is claimed is:

1. A gate driving apparatus comprising:
a first stage which outputs a first gate output signal; and
a second stage which outputs a second gate output signal,
wherein the first stage comprises:
a transistor comprising a gate electrode, a source electrode and a drain electrode; and
a dummy transistor comprising a dummy gate electrode, a dummy source electrode and a dummy drain electrode, wherein
the gate electrode receives the second gate output signal, and
the dummy source electrode is connected to one of the source electrode and the drain electrode to prevent static electricity from reaching the first stage,
wherein the first stage comprises:
a first output unit which provides the first gate output signal; and
a second output unit which receives the second gate output signal,
wherein the dummy transistor is disposed in the second output unit.

2. A gate driving apparatus comprising:
a first stage which outputs a first gate output signal; and
a second stage which outputs a second gate output signal,
wherein the first stage comprises:
a transistor comprising a gate electrode, a source electrode and a drain electrode; and
a dummy transistor comprising a dummy gate electrode, a dummy source electrode and a dummy drain electrode, wherein the gate electrode receives the second gate output signal, and the dummy source electrode is connected to one of the source electrode and the drain electrode to prevent static electricity from reaching the first stage, wherein the first stage comprises a discharging unit which receives the second gate output signal and discharges a pull-up node to a gate-off voltage, wherein the dummy transistor is disposed in the discharging unit.

3. A gate driving apparatus comprising:

a first stage which outputs a first gate output signal; and a second stage which outputs a second gate output signal, wherein the first stage comprises:

a transistor comprising a gate electrode, a source electrode and a drain electrode; and a dummy transistor comprising a dummy gate electrode, a dummy source electrode and a dummy drain electrode, wherein the gate electrode receives the second gate output signal, and the dummy source electrode is connected to one of the source electrode and the drain electrode to prevent static electricity from reaching the first stage, wherein the first stage comprises a holding unit which holds the pull-up node at the gate-off voltage, wherein the dummy transistor is disposed in the holding unit.

4. The gate driving apparatus of claim 1, wherein the dummy gate electrode is electrically floated.

5. The gate driving apparatus of claim 1, wherein the dummy drain electrode is electrically floated.

6. The gate driving apparatus of claim 1, wherein the gate electrode and the dummy gate electrode are disposed adjacent to each other, one of the source electrode and the drain electrode extends from one of a source line and a drain line, respectively, to overlap at least a portion of the gate electrode, and the dummy source electrode extends from the one of the source line and the drain line to overlap at least a portion of the dummy gate electrode.

7. The gate driving apparatus of claim 6, wherein the gate electrode is electrically insulated from the dummy gate electrode.

8. The gate driving apparatus of claim 1, wherein the first stage further comprises:

a first pad which receives the second gate output signal from the second stage;

a gate line which provides the first gate output signal to a display region; and a second pad connected to the first pad and the transistor, wherein the first pad and the second pad are connected by a bridge line.

9. The gate driving apparatus of claim 8, wherein the first pad is disposed on a first side of the gate line, and the second pad is disposed on a second side, opposite the first side, of the gate line.

10. The gate driving apparatus of claim 8, further comprising:

a gate-insulating film disposed on the gate line and the second pad; and a passivation layer disposed on the first pad and the gate-insulating film, wherein the bridge line is disposed on the passivation layer.

11. The gate driving apparatus of claim 10, further comprising a dummy pad disposed on the gate-insulating film between the gate line and the second pad.

12. The gate driving apparatus of claim 11, wherein the bridge line comprises:

a first bridge line which connects the first pad and the dummy pad; and a second bridge line which connects the dummy pad and the second pad.

13. The gate driving apparatus of claim 8, wherein the bridge line comprises a transparent conductive material.

* * * * *